US008544014B2

(12) United States Patent
Gopalan et al.

(10) Patent No.: US 8,544,014 B2
(45) Date of Patent: Sep. 24, 2013

(54) SCHEDULING THREADS IN MULTI-CORE SYSTEMS (75) Inventors: Yadhu Gopalan, Issaquah, WA (US); Bor-ming Hsieh, Redmond, WA (US); Mark Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1536 days.

(21) Appl. No.: 11/782,000

(22) Filed: Jul. 24, 2007

(65) Prior Publication Data

US 2009/0031317 A1 Jan. 29, 2009

(51) Int. Cl.
*G06F 9/46* (2006.01)
(52) U.S. Cl.
USPC ............ 718/103; 718/100; 718/102; 718/104
(58) Field of Classification Search
USPC ....................... 718/103, 100, 102, 104, 101
See application file for complete search history.

(56) References Cited

U.S. PATENT DOCUMENTS

| | | | | |
|---|---|---|---|---|
| 5,185,861 | A | * | 2/1993 | Valencia ....................... 711/120 |
| 5,745,778 | A | * | 4/1998 | Alfieri ................................ 712/1 |
| 5,784,614 | A | * | 7/1998 | Davis ............................ 718/102 |
| 5,826,079 | A | * | 10/1998 | Boland et al. ................. 718/102 |
| 5,826,081 | A | * | 10/1998 | Zolnowsky .................... 718/103 |
| 5,872,972 | A | | 2/1999 | Boland et al. |
| 6,105,053 | A | * | 8/2000 | Kimmel et al. ................ 718/105 |
| 6,243,788 | B1 | * | 6/2001 | Franke et al. ..................... 711/3 |
| 6,289,369 | B1 | | 9/2001 | Sundaresan |
| 6,327,630 | B1 | * | 12/2001 | Carroll et al. ................. 719/314 |
| 6,584,488 | B1 | | 6/2003 | Brenner et al. |
| 6,633,897 | B1 | | 10/2003 | Browning et al. |
| 6,665,699 | B1 | * | 12/2003 | Hunter et al. ................. 718/102 |
| 6,681,320 | B1 | | 1/2004 | Marr |
| 6,728,959 | B1 | | 4/2004 | Merkey |
| 6,766,515 | B1 | | 7/2004 | Bitar et al. |
| 6,993,767 | B2 | | 1/2006 | Brenner et al. |
| 7,007,046 | B2 | | 2/2006 | Manley et al. |
| 7,069,562 | B2 | | 6/2006 | Kushnirskiy et al. |
| 7,178,145 | B2 | * | 2/2007 | Bono ............................. 718/100 |
| 8,108,866 | B2 | * | 1/2012 | Anand et al. .................. 718/102 |

(Continued)

FOREIGN PATENT DOCUMENTS

| | | |
|---|---|---|
| EP | 1 770 509 A2 | 4/2007 |
| WO | WO 2005/066799 A1 | 7/2005 |
| WO | WO 2005/096143 A1 | 10/2005 |

OTHER PUBLICATIONS

Chakraborty, K. et al., "Computation Spreading: Employing Hardware Migration to Specialize CMP Cores On-the-fly," *ASPLOS '06*, San Jose, California, 10 pages (2006).

(Continued)

*Primary Examiner* — Emerson Puente
*Assistant Examiner* — Willy W Huaracha
(74) *Attorney, Agent, or Firm* — Merchant & Gould (57) ABSTRACT

Scheduling of threads in a multi-core system is performed using per-processor queues for each core to hold threads with fixed affinity for each core. Cores are configured to pick the highest priority thread among the global run queue, which holds threads without affinity, and their respective per-processor queue. To select between two threads with same priority on both queues, the threads are assigned sequence numbers based on their time of arrival. The sequence numbers may be weighted for either queue to prioritize one over the other.

15 Claims, 6 Drawing Sheets

(56) References Cited

U.S. PATENT DOCUMENTS

| | | | |
|---|---|---|---|
| 2003/0018691 A1* | 1/2003 | Bono | 709/106 |
| 2003/0110203 A1* | 6/2003 | Brenner et al. | 709/103 |
| 2003/0191794 A1* | 10/2003 | Brenner et al. | 709/103 |
| 2004/0199919 A1 | 10/2004 | Tovinkere | |
| 2005/0097578 A1 | 5/2005 | Rangarajan | |
| 2005/0132217 A1 | 6/2005 | Srinivasan et al. | |
| 2005/0246461 A1 | 11/2005 | Accapadi et al. | |
| 2006/0075398 A1 | 4/2006 | Bennett et al. | |
| 2006/0150184 A1 | 7/2006 | Hankins et al. | |
| 2006/0200825 A1* | 9/2006 | Potter | 718/100 |
| 2007/0083735 A1 | 4/2007 | Glew | |
| 2007/0083874 A1 | 4/2007 | Vasudevan et al. | |
| 2007/0220517 A1 | 9/2007 | Lippett | |
| 2007/0294694 A1 | 12/2007 | Jeter et al. | |
| 2008/0127071 A1 | 5/2008 | Lu et al. | |
| 2009/0031318 A1* | 1/2009 | Gopalan et al. | 718/103 |

OTHER PUBLICATIONS

Mackerras, P. et al., "Operating system exploitation of the POWER5 system," *IBM J. Res. & Dev.*, vol. 49, No. 4/5, pp. 533-539 (Jul./Sep. 2005).

Paxson, V. et al., "An Architecture for Exploiting Multi-Core Processors to Parallelize Network Intrusion Prevention," *IEEE Sarnoff Symposium*, 7 pages (2007).

Vouk, N., "Buddy Threading in Distributed Applications on Simultaneous Multi-Threading Processors," Master's Thesis, North Carolina State University, pp. i-viii, 1-87 (2005).

International Search Report and Written Opinion mailed Feb. 2, 2009.

Notice of Allowance mailed Aug. 12, 2012, in co-pending U.S. Appl. No. 11/782,060.

David Brash, The ARM Architecture Version 6 (ARMv6), Jan. 2002, http://www.simplemachines.it/doc/ARMv6_Architecture.pdf.

Michael M. Swift et al., Improving the Reliability of Commodity Operating Systems, Oct. 19-22, 2003, http://nooks.cs.washington.edu/nooks-sosp.pdf.

U.S. Final Office Action cited in U.S. Appl. No. 11/782,060 mailed Aug. 31, 2011.

U.S. Non-Final Office Action cited in U.S. Appl. No. 11/782,060 mailed Apr. 12, 2011.

White Paper, VME Momentum, http://www.vita.com/whitepapers/VME%20Momentum.pdf 2 pgs. (including VITA News Release dated Nov. 11, 2004 referencing the White Paper, 3 pgs.).

* cited by examiner

SCHEDULING THREADS IN MULTI-CORE SYSTEMS

BACKGROUND

A multi-core microprocessor (or chip-level multiprocessor, CMP) is one that combines two or more independent processors into a single package, often a single integrated circuit (IC). For example, a dual-core device contains two independent microprocessors and a quad-core device contains four microprocessors. A multi-core microprocessor implements multiprocessing in a single physical package. Cores in a multi-core device may share a single coherent cache at the highest on-device cache level or may have separate caches. The processors typically also share the same interconnect to the rest of the system. Each "core" independently implements optimizations such as superscalar execution, pipelining, and multithreading. A system with N cores is effective when it is presented with N or more threads concurrently.

On a multi-core system there needs to be a mechanism to efficiently schedule threads on the various cores. This challenge becomes even more complicated when thread affinity is taken into consideration as well. Thread affinity is where a thread is fixed to run on a particular core. Even if scheduling of threads with affinity is solved efficiently, scheduling of threads without affinity and choosing of the right thread for a particular core are further challenges to be overcome by designers.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to scheduling threads on a global run queue and per processor queues depending on their affinity status (whether or not they have fixed affinity and to which core). Priority of the threads for runtime is determined by a sequence number that may be assigned based on an arrival order of the threads and/or their native priority. To optimize core usage, the sequence numbers for threads on per processor queues may be weighted relative to the threads on the global queue.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, threads in a multi-core system may be scheduled on a GRQ and per-processor queues depending on their affinity status using weighted sequencing for priority determination. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
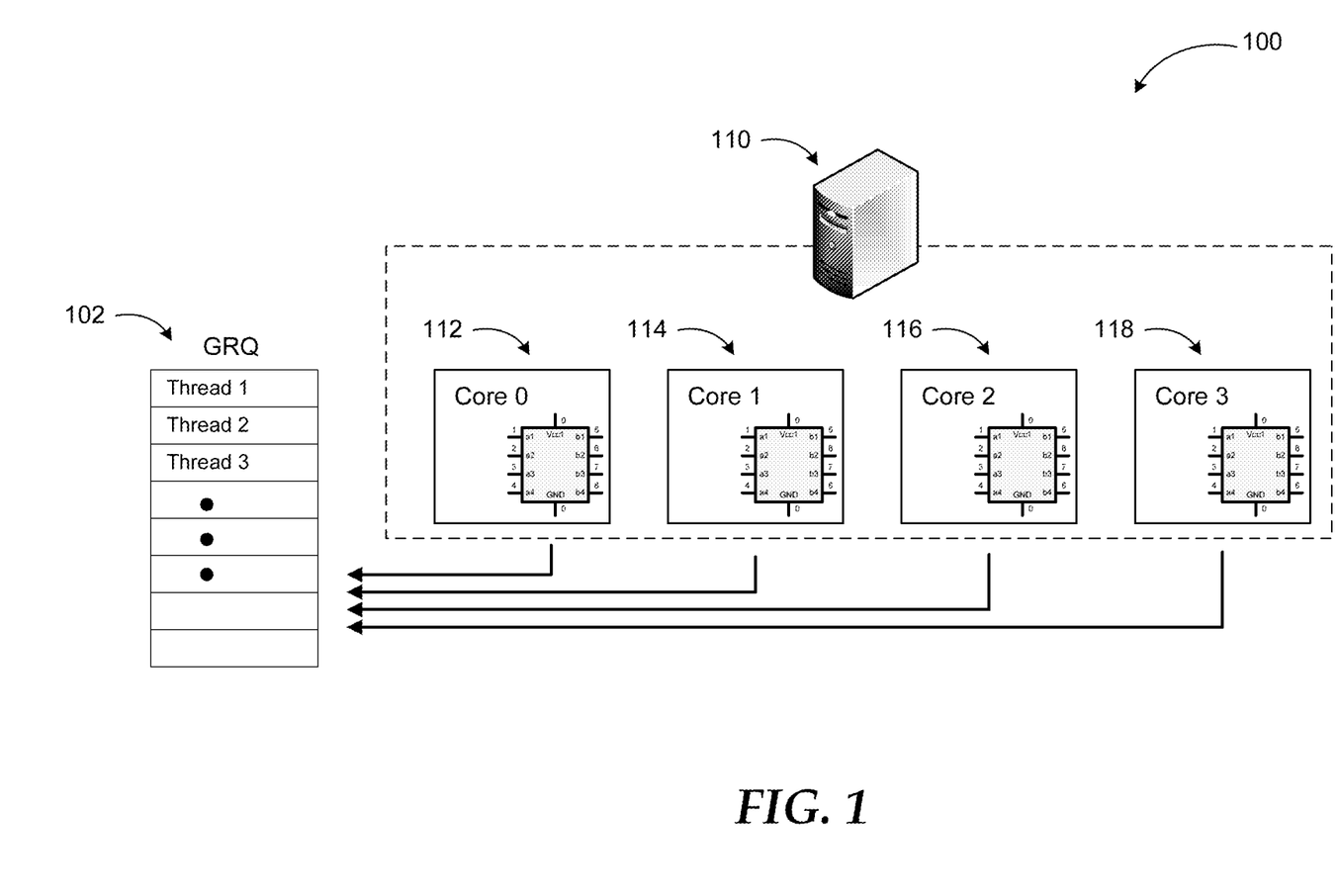
FIG. 1 illustrates an example multi-core system with a Global Run Queue (GRQ) holding threads while they await core availability.

Referring to FIG. 1, an example multi-core system with a Global Run Queue (GRQ) holding threads while they await core availability. In a single core system, scheduling of threads is a relatively straight forward process since all threads are typically held in a single queue and ordered by a predefined prioritization method to be processed by the processor one-by-one.

Multi-core systems, which are becoming increasingly popular, provide many advantages in terms of processor power, efficiency, and the like. Furthermore, the close proximity of multiple CPU cores on the same die has the advantage of allowing the cache coherency circuitry to operate at a much higher clock rate than is possible if the signals have to travel off-chip. Combining equivalent CPUs on a single die significantly improves the performance of cache snoop operations. This means that signals between different CPUs travel shorter distances, and therefore those signals degrade less. These higher quality signals allow more data to be sent in a given time period since individual signals can be shorter and do not need to be repeated as often.

Assuming that the die can fit into the package, physically, the multi-core CPU designs require much less Printed Circuit Board (PCB) space than multi-chip designs. Also, a dual-core processor uses typically less power than two coupled single-core processors, principally because of the increased power required to drive signals external to the chip and because the smaller silicon process geometry allows the cores to operate at lower voltages. Moreover, the cores share some circuitry, like the L2 cache and the interface to the front side bus (FSB).

Software also benefits from multi-core architectures where code can be executed in parallel. Under most common operating systems, this requires code to execute in separate threads or processes. Each application running on a system runs in its own process so multiple applications will benefit from multi-core architectures. Each application may also have multiple threads but, in most cases, it may have to be specifically written to utilize multiple threads. Operating system software also tends to run many threads as a part of its normal operation. Running virtual machines benefits from adoption of multiple core architectures since each virtual machine runs independently of others and can be executed in parallel.

As shown in the figure, the processor block of system 110 may include any number of cores, for example four. Core 0 (112), core 1 (114), core 2 (116), and core 4 (118) may process separate threads in parallel increasing the performance of the system. GRQ 102 holds threads from applications or the operating system waiting availability of a core. A scheduler (not shown) may schedule the threads in the GRQ 102 based on a priority assigned by the owner application, by system conditions, predefined rules, and the like. As each thread is grabbed by an available core, the remaining threads move up one place if new threads with higher priority arrive, they may be placed above some of the already waiting threads.

Figure 2:
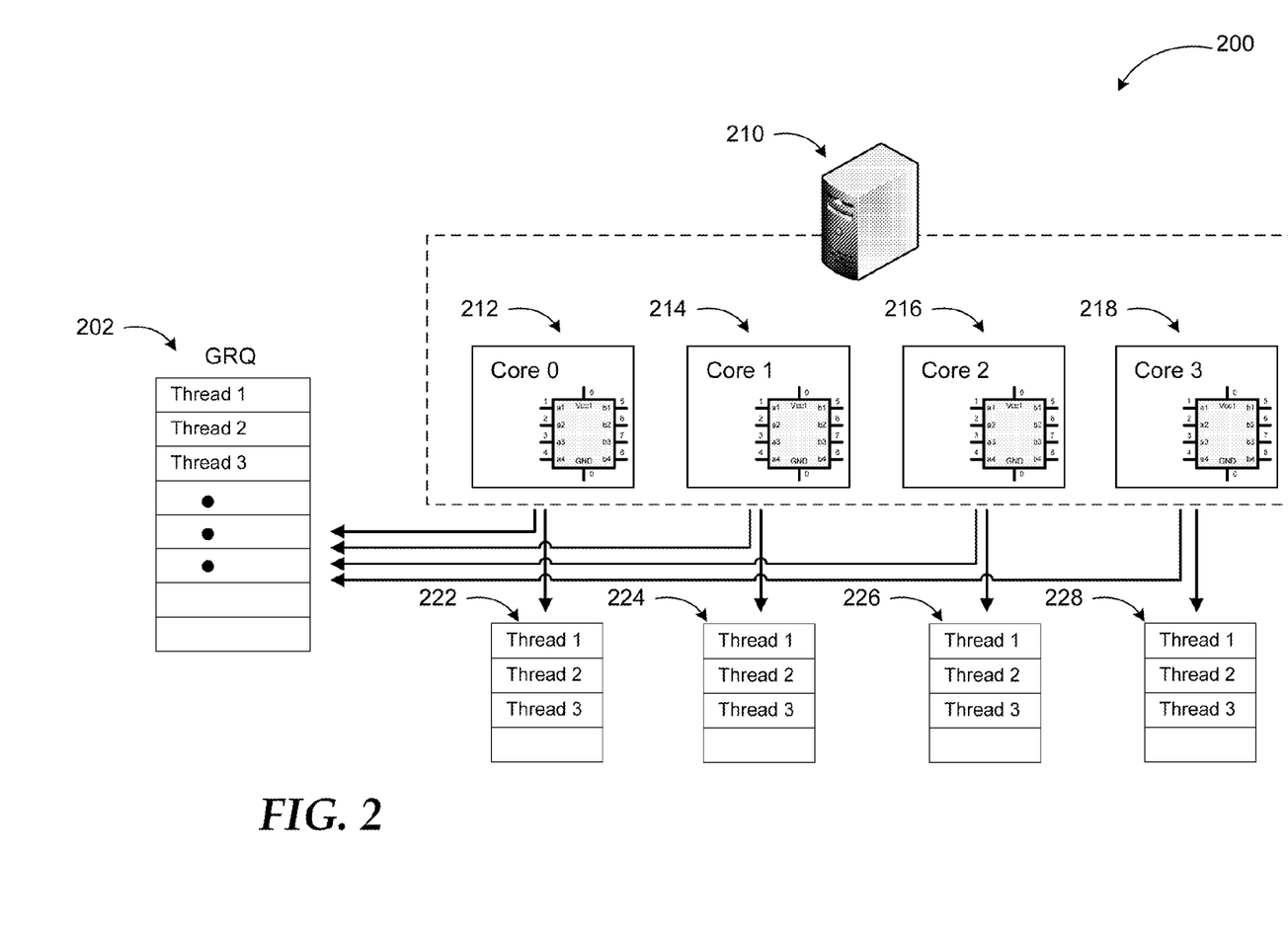
FIG. 2 illustrates an example multi-core system with a GRQ and multiple per-processor queues holding threads while they await core availability.

FIG. 2 illustrates an example multi-core system with a GRQ and multiple per-processor queues holding threads while they await core availability. Along with the proliferation of multi-core systems and applications (as well as operating systems) that take advantage of capabilities of such systems, the thread scheduling has also seen changes. For example, thread affinity is a concept, where an application (or the system) may assign fixed affinity for particular threads to select cores. Thus, those threads are always processed by their assigned cores.

If all threads, including the fixed affinity ones and the no-affinity ones, are held by the GRQ, an inefficient use of system resources may result. For example, a number of threads with fixed affinity may hold tip the upward incrementation of the threads in the GRQ when other cores are available for processing.

According to some embodiments, separate per-processor queues (222, 224, 226, 228) associated with each core (212, 214, 216, 218, respectively) may be utilized to hold threads with fixed affinity for the respective cores. When a thread is received for processing, the scheduler may first check if the thread has a fixed affinity for a particular core. If the thread is assigned to a particular core, it is placed in the respective per-processor queue depending on the priority of the thread and the already waiting threads in that queue. In such systems, the GRQ still exists for threads that do not have fixed affinity.

When a processor core becomes available in a system like multi-core system 210, it checks both the GRQ 202 and its own per-processor queue (e.g. 222, 224, 226, 228). In situations, where the queues (the GRQ and the per-processor queues) have threads with varying priorities, the cores can easily select the highest priority thread and process it. However, when the threads in both the GRQ and the per-processor queue have the same priority, the selection may be challenging.

According to other embodiments, the scheduler may assign a sequence token to each thread scheduled in the GRQ or in one of the per-processor queues. The sequence may be assigned based on a time of arrival at the scheduler and/or the thread's priority level. The available cores then pick the thread from either queue based on their sequence token. According to further embodiments, the sequence number assigned to each thread may be weighted between the GRQ and the per-processor queues such that one is given higher priority than the other. For example, the sequence tokens issued to thread in the GRQ may begin at $S=1$ and increment by 1 as new threads arrive. On the other hand, the sequence tokens for the per-processor queue for a particular core may be given sequence numbers based on $S-3$, meaning the threads in the per-processor queue are automatically de-prioritized by two threads compared to the threads in the GRQ. These processes are described in more detail below in conjunction with FIG. 3 and FIG. 6.

While the example systems are described above with specific core numbers and queue configuration, embodiments are not so limited. A multi-core system using per-processor queues with weighted sequencing may be implemented using any number of cores and/or queues. For example, a group of cores may share a per-processor queue.

Figure 3:
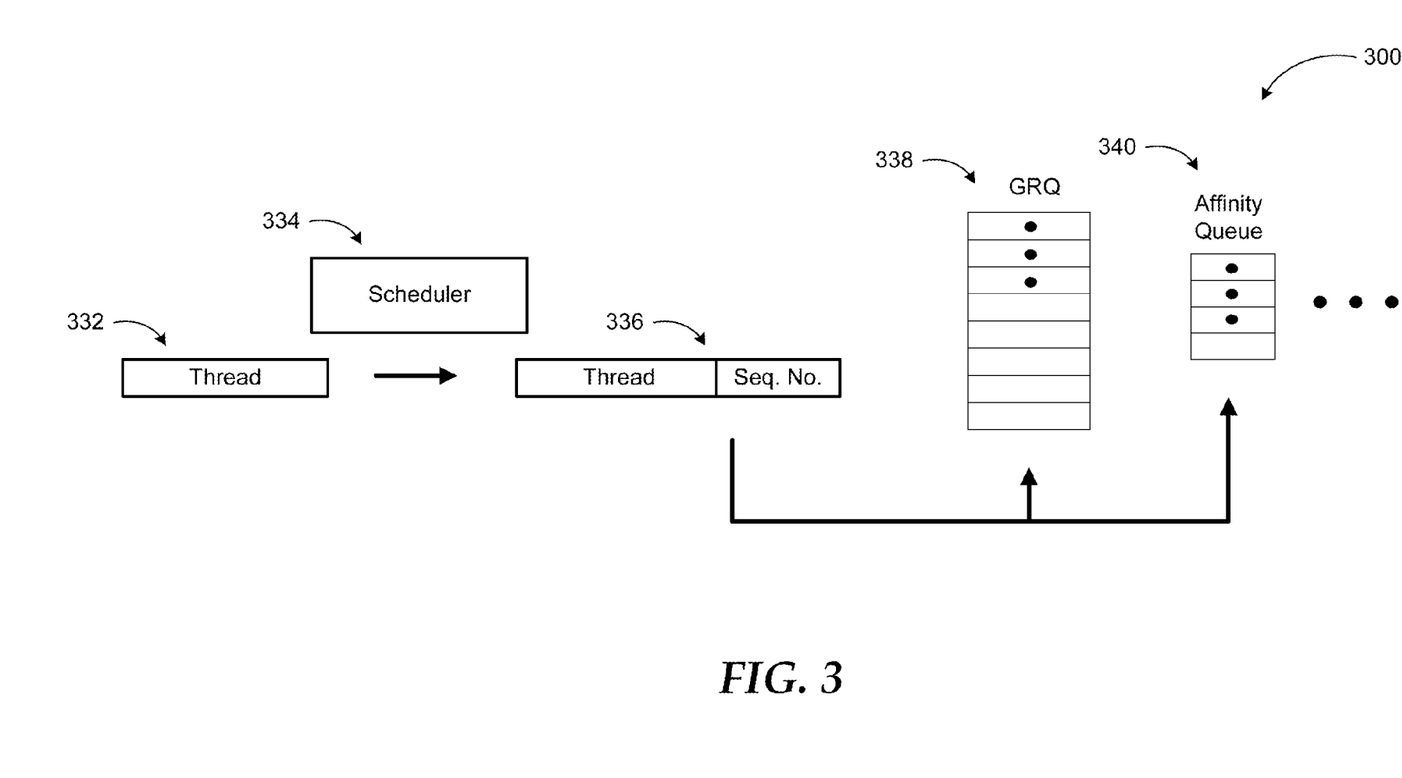
FIG. 3 is a conceptual diagram illustrating scheduling of threads in a core affinity enabled system using weighted sequencing according to embodiments.

FIG. 3 is a conceptual diagram illustrating scheduling of threads in a core affinity enabled system using weighted sequencing according to embodiments.

According to embodiments, efficient scheduling of threads in a multi-core system is enabled by introducing per-processor run queues (e.g. affinity queue 340) in addition to global run queue GRQ 338. Scheduler 334 places a thread (e.g. thread 332) with fixed affinity on affinity queue 340 associated with the core assigned to the thread. If thread 332 does not have an affinity, then it is placed on GRQ 338.

When a thread is placed on any of the queues, scheduler 334 assigns an incremented sequence number to the thread giving the kernel indication about when the thread was placed on the queue. Each core picks threads from the queues by first looking at the highest priority thread that is available. If the GRQ 338 and affinity queue (per-processor queue) 340 have threads with equal priority, the core picks the thread with earlier sequence number (i.e. the thread that arrived earlier).

As described above, the sequence numbering of the threads may also be weighted between the different queues. For example, the threads in the per-processor queue may be given sequence numbers that are higher by a predefined increment from those in the GRQ. That way, the threads in the GRQ are essentially prioritized over the threads in the per-processor queue. Of course, an opposite weighting scheme may also be employed prioritizing the threads in the per-processor queue over those in the GRQ. The incremental weighting may be predefined by the system based on a core type, system conditions, number of applications running on the system, and similar conditions.

Figure 4:
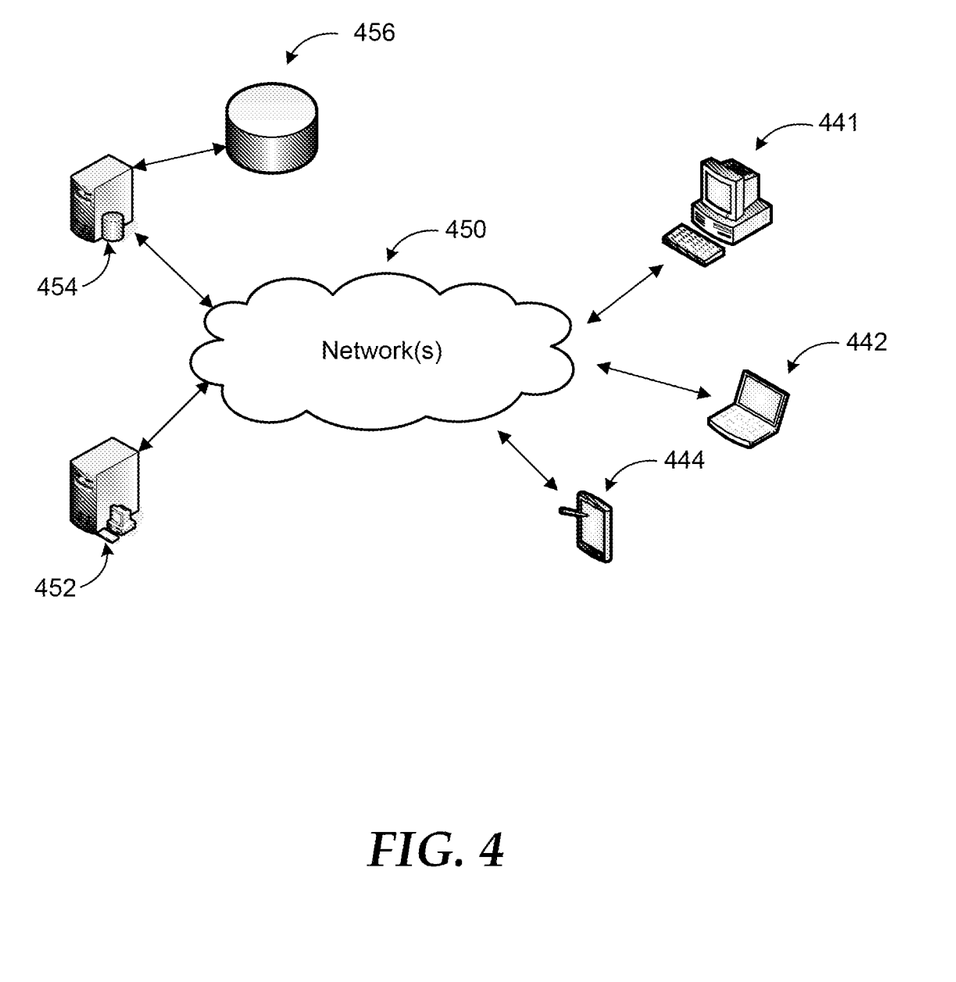
FIG. 4 is an example networked environment, where embodiments may be implemented.

FIG. 4 is an example networked environment, where embodiments may be implemented. Scheduling threads in a multi-core system using weighted sequencing and per-processor queues may be implemented locally on a single computing device or in server providing services in a distributed manner to clients over a number of physical and virtual systems. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing scheduling of threads using per-processor queues and a GRQ may involve many more components, relevant ones are discussed in conjunction with this figure.

Any one of the computing devices in the figure, such as client devices 441-443 or servers 452 and 454 may be multi-core devices implementing scheduling of threads by sequencing over GRQ and per-processor queues. Each computing device may have its own operating system or share one, and each device may execute applications that run locally or interact with other devices/applications. Thus, the cores of the processors of each device may receive threads from the operating systems and/or applications running locally or on other devices.

Schedulers for the processors of each device or the system may place the threads on the GRQ(s) and per-processor queues based on their affinity status as described above assigning sequence numbers that may be weighted depending on whether the queue is a GRQ or a per-processor queue. Results of processed threads are then provided by the respective cores to the submitting operating system or application.

The networked system may also include data stores (e.g. 456) and associated database servers (e.g. 454) to store data associated with the applications providing the threads to the multi-core processors as well as associated with the operating system(s).

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement scheduling of threads in a multi-core system using weighted sequencing over GRQ and per-processor queues. Furthermore, the networked environments discussed in FIG. 4 are for illustration purposes only. Embodiments are not limited to the example applications, modules, or processes.

Figure 5:
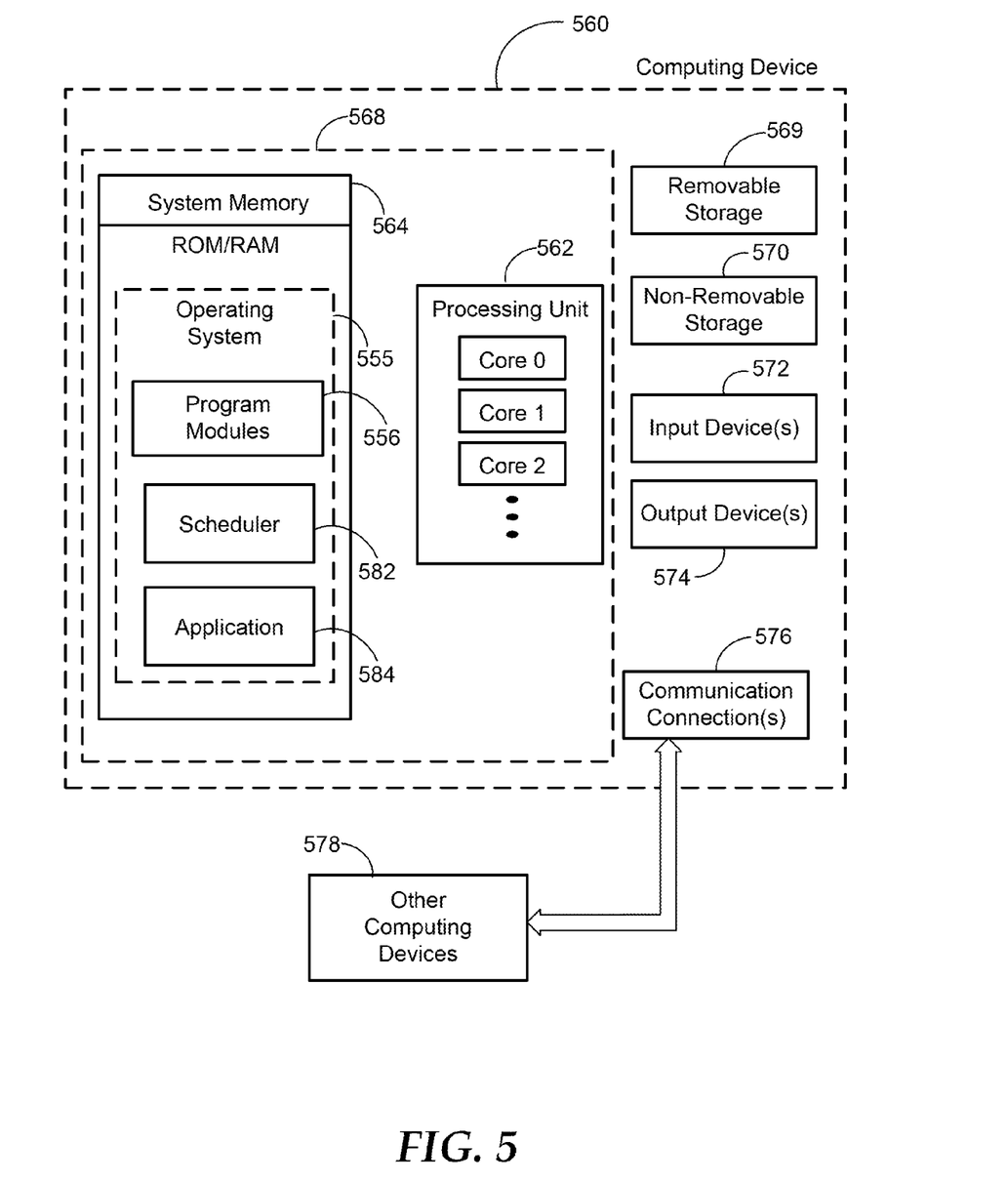
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 560. In a basic configuration, the computing device 560 may be a server or client device and typically include at least one processing unit 562 with multiple cores and system memory 564. Computing device 560 may also include a plurality of processing units that cooperate in executing programs. Depending on the exact configuration and type of computing device, the system memory 564 may be volatile (such as RAM), non-volatile (such as ROM, flash memory, etc.) or some combination of the two. System memory 564 typically includes an operating system 565 suitable for controlling the operation of a networked computing device, such as the WINDOWS® operating systems from MICROSOFT CORPORATION of Redmond, Wash. The system memory 564 may also include one or more software applications such as program modules 566, scheduler 582, and application 584.

Scheduler 582 may place threads from application 584 (and other applications) or operating system 555 in a GRQ and per-processor queues associated with the processing unit 562. When scheduling the threads for processing the cores, scheduler 582 may assign sequence numbers to the threads based on their time of arrival such that a core can pick the earlier arriving thread when two threads with equal priority are available in the GRQ and the respective per-processor queue. The scheduler 582 may also weight the sequence numbers such that one of the GRQ or the per-processor queue is given priority over the other. This basic configuration is illustrated in FIG. 5 by those components within dashed line 568.

The computing device 560 may have additional features or functionality. For example, the computing device 560 may also include additional data storage devices (removable and/or non-removable) such as, for example, magnetic disks, optical disks, or tape. Such additional storage is illustrated in FIG. 5 by removable storage 569 and non-removable storage 570. Computer storage media may include volatile and non-volatile, removable and non-removable media implemented in any method or technology for storage of information, such as computer readable instructions, data structures, program modules, or other data. System memory 564, removable storage 569 and non-removable storage 570 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 560. Any such computer storage media may be part of device 560. Computing device 560 may also have input device(s) 572 such as keyboard, mouse, pen, voice input device, touch input device, etc. Output device(s) 574 such as a display, speakers, printer, etc. may also be included. These devices are well known in the art and need not be discussed at length here.

The computing device 560 may also contain communication connections 576 that allow the device to communicate with other computing devices 578, such as over a wireless network in a distributed computing environment, for example, an intranet or the Internet. Other computing devices 578 may include devices that execute distributed applications, which may submit threads to scheduler 582 of computing device 560. Communication connection 576 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
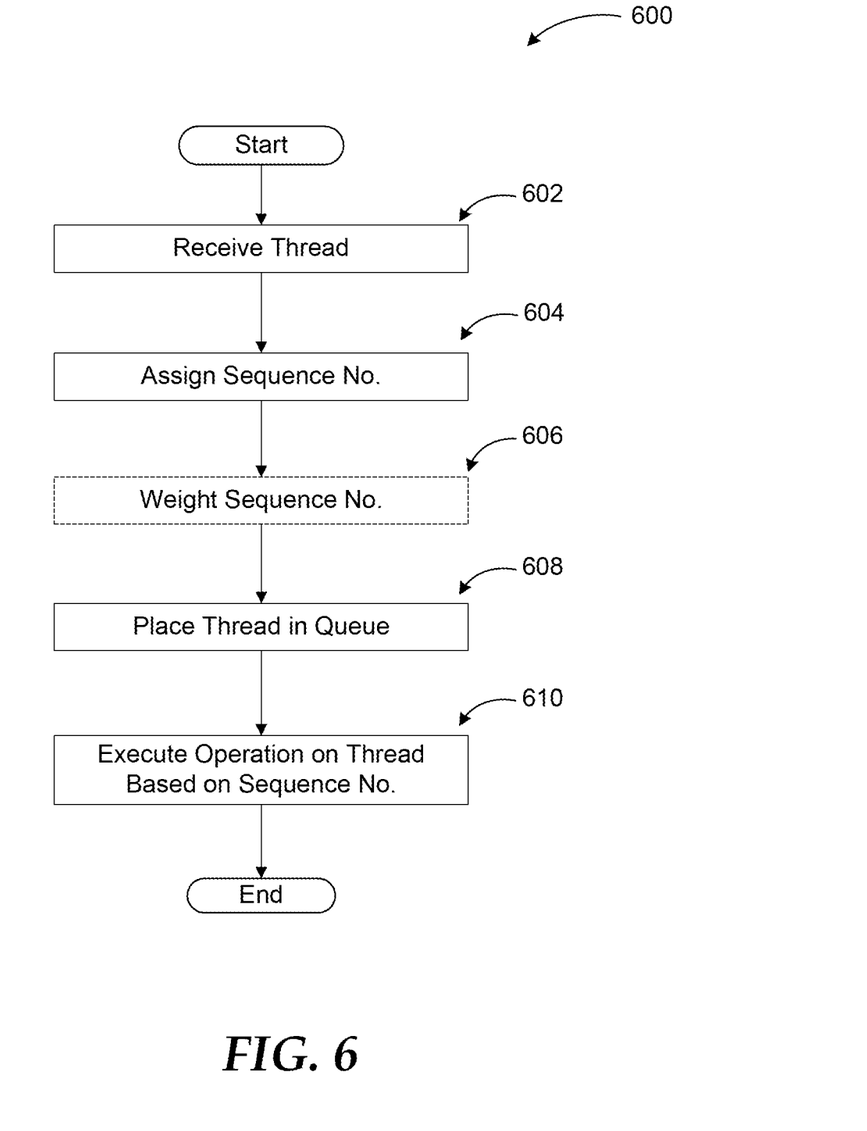
FIG. 6 illustrates a logic flow diagram of a process of scheduling and processing of threads in a multi-core system according to embodiments.

FIG. 6 illustrates a logic flow diagram of process 600 for scheduling and processing of threads in a multi-core system according to embodiments. Process 600 may be implemented in a multi-core processing unit of a computing device.

Process 600 begins with operation 602, where a thread is received from an application or the operating system. An affinity of the thread (if one exists) may also be determined at this operation. Processing advances from operation 602 to operation 604.

At operation 604, a sequence number is assigned to the received thread based on the time of arrival. The sequence number may also be assigned based on a priority of the thread, the core to which the thread has an affinity, system conditions, and so on. Processing continues to optional operation 606 from operation 604.

At optional operation 606, the sequence number is weighted. Depending on how the GRQ and the respective per-processor queue are to be prioritized for the particular core, the sequence number may be incremented or decremented for one of the queues. According to some embodiments, the weighting may be done while the sequence number is assigned. According to other embodiments, other factors such as those listed above may also be taken into account when the weighting factor is determined. Processing moves to operation 608 from optional operation 606.

At operation 608, the thread is placed into the queue. If the thread does not have an affinity, it is placed in the GRQ. If it has a fixed affinity with a particular core, it is placed into the per-processor queue for that particular core. Processing moves to operation 610 from operation 608.

At operation 610, a core becomes available, picks the thread based on its sequence number, and executes operations associated with the thread. After operation 610, processing moves to a calling process for further actions.

The operations included in process 600 are for illustration purposes. Scheduling threads in a multi-core system using weighted sequencing over a GRQ and per-processor queues according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for scheduling threads in a multi-core processor system, the method comprising:
receiving a thread to be scheduled for processing by the multi-core processor system;
determining whether the received thread has a fixed affinity for a particular core of the multi-core processor system;
assigning a sequence number to the received thread based on time of arrival of the thread when the thread is determined to not have a fixed affinity for the particular core and assigning a sequence number to the received thread based on time of arrival plus an offset when the thread is determined to have a fixed affinity;
placing the thread in a per-processor queue for the particular core when the thread is determined to have a fixed affinity for the particular core;
placing the thread in a global run queue for all available cores of the multi-core processor system when the thread is determined to not have a fixed affinity for the particular core; and
processing the threads from the global run queue and the per-processor queue according to the assigned sequence number.

2. The method of claim 1, wherein the assigning the sequence number to the received thread based on time of arrival plus the offset when the thread is determined to have a fixed affinity comprises incrementing and decrementing the sequence number by a pre-defined fixed amount relative to the threads placed in the global run queue when the thread is placed in the per-processor queue.

3. The method of claim 2, further comprising:
if two threads with equal priority are available in the global run queue and the per-processor queue for the particular core, picking the thread with a smaller weighted sequence number for processing.

4. The method of claim 2, wherein the assigning the sequence number to the received thread based on time of arrival plus the offset when the thread is determined to have a fixed affinity further comprises adding the offset based on one from a system condition, a number of currently running applications, an expected processing time of the thread, and a core type.

5. The method of claim 1, wherein the thread is received from one of an application and an operating system.

6. The method of claim 5, wherein the application is executed by one of the multi-core processor system locally and another processing system remotely.

7. The method of claim 1, further comprising:
providing a result of processing the thread to one of a submitting application and an operating system associated with the multi-core processor system.

8. A system for scheduling threads in a multi-core processor environment, the system comprising:
a memory;
a multi-core processor coupled to the memory, comprising a plurality of distinct processing cores, the multi-core processor configured to:
receive a thread to be to be scheduled for processing by the multi-core processor;
determine whether the received thread has a fixed affinity for a particular core of the multi-core processor;
assign a sequence number to the received thread based on time of arrival of the thread when the thread is determined to not have a fixed affinity for the particular core and assigning a sequence number to the received thread based on time of arrival plus an offset when the thread is determined to have a fixed affinity;
place the thread in a per-processor queue for the particular core when the thread has a fixed affinity for the particular core of the multi-core processor; and
place the thread in a global run queue for all available cores of the plurality of cores of the multi-core processor when the thread is determined to not have a fixed affinity for the particular core; and processing the threads from the global run queue and the per-processor queue according to the assigned sequence number.

9. The system of claim 8, wherein the assigning the sequence number to the received thread based on time of arrival plus the offset when the thread is determined to have a fixed affinity comprises incrementing and decrementing the sequence number by a pre-defined fixed amount relative to the threads placed in the global run queue when the thread is placed in the per-processor queue.

10. The system of claim 8, wherein the processor is configured to pick the thread based on the sequence number when two threads in the global run queue and the pre-processor queue have equal priorities.

11. The system of claim 8, wherein a distinct per-processor queue is reserved for each processing core.

12. The system of claim 8, wherein a distinct per-processor queue is reserved for a group of processing cores.

13. A computer-readable storage medium with instructions encoded thereon for scheduling threads in a multi-core processor system, the instructions comprising:
   receiving a thread to be scheduled for processing by the multi-core processor system;
   determining whether the received thread has a fixed affinity for a particular core of the multi-core processor system;
   assigning a sequence number to the received thread based on time of arrival of the thread when the thread is determined to not have a fixed affinity for the particular core and assigning a sequence number to the received thread based on time of arrival plus an offset when the thread is determined to have a fixed affinity;
   placing the thread in a per-processor queue for the particular core when the thread is determined to have a fixed affinity for the particular core;
   placing the thread in a global run queue for all available cores based on the when the thread is determined to not have a fixed affinity for the particular core; and
   processing the threads from the global run queue and the per-processor queue according to assigned sequence number.

14. The computer-readable storage medium of claim 13, wherein the assigning the sequence number to the received thread based on time of arrival plus the offset when the thread is determined to have a fixed affinity further comprises adding the offset based on one from a set of: a system condition, a number of currently running applications, an expected processing time of the thread, and a core type.

15. The computer-readable storage medium of claim 13, wherein the thread is received from one from a set of: a local application, a local operating system, a remote application, and a distributed operating system.

\* \* \* \* \*